G. P. LUCKEY.
FLEXIBLE TRANSMITTING DEVICE.
APPLICATION FILED JAN. 11, 1922.

1,427,829. Patented Sept. 5, 1922.

Inventor
G. P. Luckey
By Robert H. Young
Attorney

Patented Sept. 5, 1922.

1,427,829

UNITED STATES PATENT OFFICE.

GEORGE P. LUCKEY, OF DAYTON, OHIO.

FLEXIBLE TRANSMITTING DEVICE.

Application filed January 11, 1922. Serial No. 528,554.

*To all whom it may concern:*

Be it known that I, GEORGE P. LUCKEY, a citizen of the United States, residing at Dayton, in the county of Montgomery and State of Ohio, have invented certain new and useful Improvements in Flexible Transmitting Devices, of which the following is a specification.

This invention relates generally to flexible transmitting devices and more particularly to improvements in the casings of such devices.

The common form of Bowden control consists of a flexible casing having a flexible element therein which can be moved back and forth longitudinally with respect to the casing. When this type of control is used to transmit a large force with rapid oscillations of the inner wire or rod (as for example in operating the trigger motor of a synchronized machine gun) the casing, which is usually formed of spirally-coiled wire with the coils arranged close to each other, is compressed and springs out or expands so that its length relatively to the inner wire is changed.

The present invention aims to provide a casing which is flexible but which will not stretch or compress longitudinally. The fundamental part of this casing consists of a tube made up of longitudinal members extending the length of the casing. These longitudinally extending members are prevented from moving in any direction relative to each other except longitudinally and in this direction they are allowed to slide upon each other when the casing is bent.

The invention is described in connection with the accompanying drawings illustrative of different embodiments thereof.

Figure 5:
Figure 6:
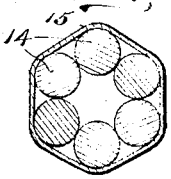

Figures 5 and 6 are longitudinal and transverse sections respectively of a modified form of casing; and Figures 7 and 8, 9 and 10, and 11 and 12 are longitudinal and transverse sections of further forms of casings which are included within the purview of the invention.

Figure 1:
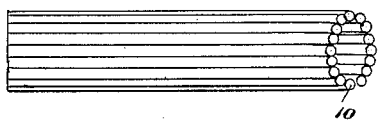
Figure 1 is a side elevation of the longitudinal wires of the casing.
Figure 2:
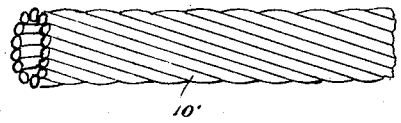
Figure 2 is a side elevation showing the longitudinally extending wires slightly twisted about the longitudinal axis of the casing.
Figure 3:
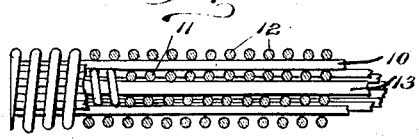
Figures 3 and 4 are longitudinal and transverse sections respectively through a control casing. The control wire being also shown in Fig. 4.
Figure 4:
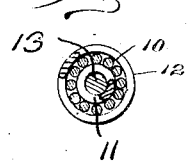

Referring to Figures 1, 3 and 4, the numeral 10 designates longitudinally extending wires arranged in contact so as to form a hollow cylinder. In order to prevent lateral displacement of these wires, loosely coiled springs 11 and 12 are placed inside and outside of the tube formed by the longitudinal wires. The core or central wire 13 extends longitudinally within the coiled spring 11. A single layer of wires 10, having as small a diameter as the forces to be exerted will allow, is preferably used to obtain flexibility. If the wires comprising the casing are slightly twisted so that they make a very steep spiral as indicated at 10', Fig. 2, then when the casing is bent the wires are all compressed or extended equally. The wire on the outside of the bend on one portion will have been turned so that it is on the inside a little farther along. A casing of this type made up of a large number of small wires is more flexible than one composed of a few large wires. Satisfactory results may also be obtained by using a loosely coiled spring 11 on the inside of the longitudinal wires and any suitable wrapping such as the wire, cord or fabric 15 illustrated in Fig. 5 on the outside for holding the wires together.

In the form of casing shown in Figs. 5 and 6 a number of relatively large wires, herein designated 14 and shown as six in number, are arranged longitudinally and held together in cylindrical form by a cord, wire or fabric 15 wrapped or woven around the exterior thereof.

Figure 7:
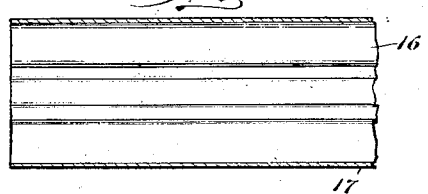
Figure 8:
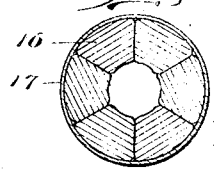

Longitudinally extending wires 16 of wedge-shaped section are placed so as to form sectors of a hollow cylindrical casing as shown in Figures 7 and 8. These wires are maintained from outward radial movement by a suitable binding 17. The wedge-shaped form of the wires prevents inward radial movements thereof but permits relatively longitudinal sliding movements when the casing is bent.

Figure 9:
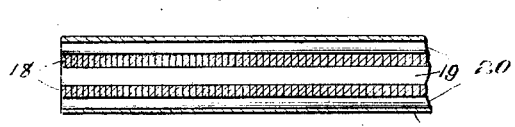
Figure 10:
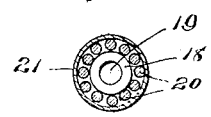

Instead of a loosely coiled spring on the inside a series of rigid rings 18, Figures 9 and 10 may be used having axial openings 19 for receiving the control wire or rod. Longitudinally extending wires 20 surrounding the rings are held from lateral displacement by an outer covering 21.

Figure 11:
Figure 12:
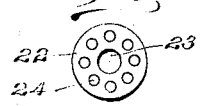

As a further modification of the invention a series of discs 22, Figures 11 and 12 having a central opening 23 and an annular row of holes 24 for receiving the longitudinally extending wires may be utilized. It is not necessary to use an outer covering for the series of discs although a flexible binding may be employed if desired.

It will be understood that the particular constructions described and shown have been chosen for illustrative purposes merely and that the invention as defined by the claims hereunto appended may be otherwise embodied and applied without departing from the spirit and scope thereof.

I claim:

1. In a flexible transmitting device, a casing comprising longitudinally extending members, and means constraining said members against relative displacement other than relative longitudinal movement when the casing is bent.

2. The combination with a non-revoluble and flexible element for transmitting power and motion, of a casing surrounding said element comprising longitudinally extending members, and means constraining said members from relative lateral displacement.

3. In a flexible transmitting device, a casing comprising longitudinally extending wires forming a hollow cylinder, and means constraining said wires against relative displacement other than relative longitudinal movement when the casing is bent.

4. The combination with a non-revoluble and flexible element for transmitting power and motion, of a casing surrounding said element comprising longitudinally extending wires and means constraining said wires from relative lateral displacement but permitting relative longitudinal movements thereof.

In testimony whereof I affix my signature.

GEORGE P. LUCKEY.